Dec. 18, 1956  G. MARULLO ET AL  2,774,655
APPARATUS FOR PURIFYING RAW SULPHUR
Original Filed Feb. 8, 1951  2 Sheets-Sheet 1

Gerlando Marullo and
Domenico Maragliano
By Knight B. Attorneys

Dec. 18, 1956 G. MARULLO ET AL 2,774,655
APPARATUS FOR PURIFYING RAW SULPHUR
Original Filed Feb. 8, 1951 2 Sheets-Sheet 2

Garlando Marullo and
Domenico Maragliano
By Knight Bros Attorneys

United States Patent Office 2,774,655
Patented Dec. 18, 1956

2,774,655

APPARATUS FOR PURIFYING RAW SULPHUR

Gerlando Marullo and Domenico Maragliano, Milan, Italy, assignors to Montecatini, Societa General per l'Industria Mineraria e Chimica, a corporation of Italy Original application February 8, 1951, Serial No. 210,024, now Patent No. 2,689,783, dated September 21, 1954. Divided and this application May 23, 1952, Serial No. 289,620

Claims priority, application Italy March 28, 1950

4 Claims. (Cl. 23—286)

This is a division of our previous application, Serial No. 210,024, filed on February 8, 1951, entitled "Continuous Process for Purifying Raw Sulfur," which application issued as Patent No. 2,689,783, on September 21, 1954. The present division covers the subject matter of the apparatus claims originally presented in the application and required to be divided from the method claim.

Among the various processes proposed for purifying raw sulphur, which is generally contaminated by various hydrocarbons, the method which comprises essentially carbonizing the impurities by putting molten sulphur into contact with sulphur trioxide, has proved to be particularly effective.

To carry out said process, it has been proposed to make sulphur trioxide or gases containing it bubble in the mass of raw sulphur brought to the molden condition. In practice, however, this method offers some inconveniences, among which the following should be specially noted: (a) the compression of sulphur trioxide, or of the gas containing it, is necessary in order to overcome the pressure head of molten sulphur; (b) the discontinuity of the process with consequent bad utilization of sulphur trioxide, which at the beginning is all reduced to sulphur dioxide, while growing portions thereof remain unaltered as the operation progresses, thus constituting a loss.

The inconveniences mentioned above are overcome now with the continuous process according to the present invention for the refining of molten raw sulphur by means of sulphur trioxide, characterized in that gases containing sulphur trioxide and raw sulphur in molten condition are made to circulate in countercurrent, said sulphur being prevailingly maintained in the shape of continually renewed thin layers arranged in a direction normal to the direction of gas flow.

It is a further object of the invention to provide a device for carrying out said process, essentially constituted by a horizontal drum provided inside with mobile members suited to obtain the working conditions as required by said process.

The invention will now be described in detail with reference to the accompanying drawings, wherein one of the preferred embodiments of the invention is diagrammatically represented by way of example and not by way of limitation, as follows.

The apparatus in its essential lines is constituted by a metal drum 1, provided in its lower portion, over its whole length, with a jacket 2, which extends about as far as the middle line, being provided with joints 3 and 4 for the circulation of the heating fluid. The two heads of the drum 1 are provided in turn with conduits 5 and 6 respectively for the introduction and discharge of the gas containing $SO_3$, and 7 and 8 respectively for the introduction and discharge of the molten sulphur.

Figures 1, 2:
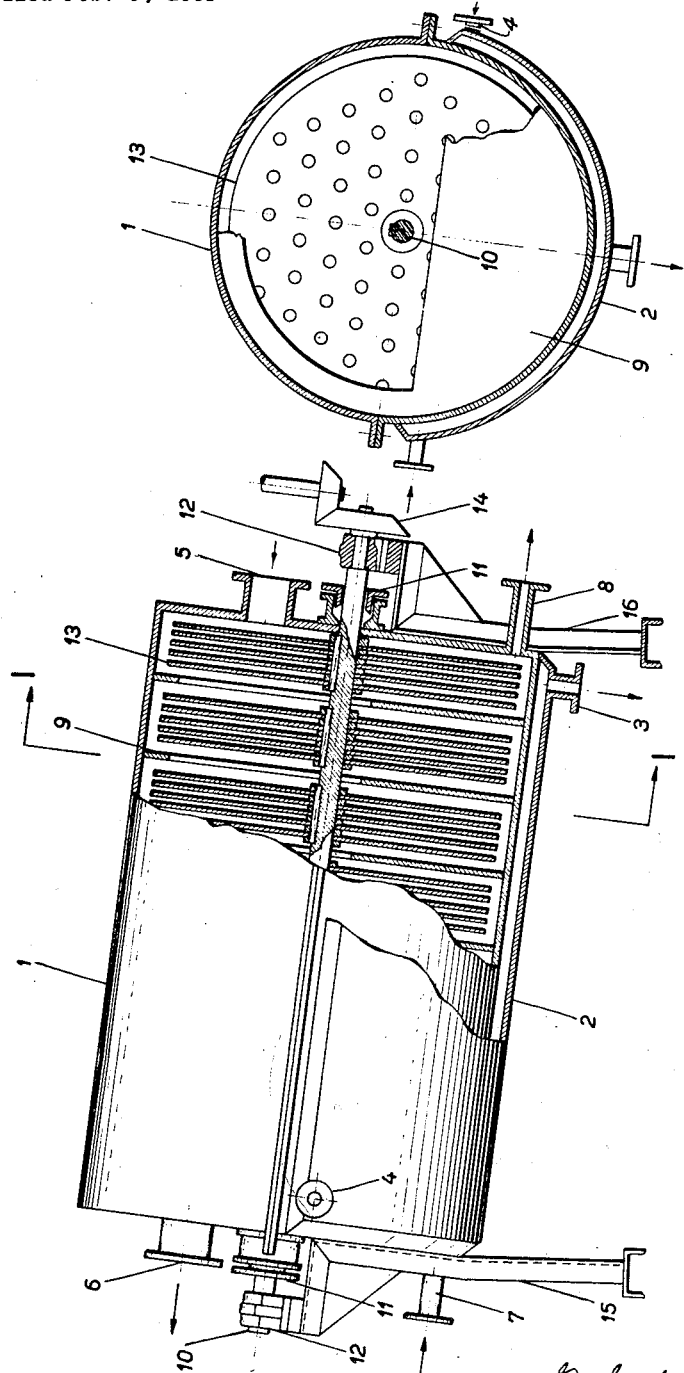
Fig. 1 is a longitudinal view, partly in section, of the apparatus according to the invention.
Fig. 2 is a transverse view, partly in section, along the line I—I of Fig. 1.

The drum 1 is divided inside into a number of chambers by baffles 9, which in their lower part extend nearly up to the height of the middle axis, forming an equal number of liquid-proof pockets, while in the upper part (Fig. 2) they are reduced to a simple annular border, so that in the upper half of the drum there remains free a wide central space by way of which the chambers are in communication with one another.

The drum 1 is passed through over its whole length by a shaft 10 emerging from the heads through stuffing boxes 11 and is supported in external bearings 12 of supports provided for this purpose.

On the shaft 10 there are fitted a number of perforated metal discs 13 conveniently arranged and spaced from one another in such a manner that the holes of two contiguous discs are staggered. An external gearing serves to drive the rotary shaft 10 together with its perforated discs 13, by means of a drive motor not shown in the drawings.

Two supports of different height, 15 and 16 respectively, keep the apparatus in a position inclined with respect to the horizontal.

It is obvious that the number of internal chambers, and consequently the length of the drum, as well as the number of perforated discs, may vary in accordance with the cases of application as well as with factors such as required output per hour, percentage of impurities in the raw material and so on.

The heating jacket 2 has the task of keeping the mass of sulphur in fluid condition, in particular during possible interruptions of operation, and it is limited to the lower half of the drum, because in the upper half there are already hot gases circulating.

The operation of the apparatus is self-evident. Molten sulfur enters at 7 and leaves at 8 after successively filling the various pockets existing between the baffles 9, while the gas containing $SO_3$ enters at 5 and leaves at 6 after skimming over the discs 13 and passing from one to the other mainly through their holes, which are conveniently staggered in the contiguous discs. The discs turn with a good part of their surface immersed in the molten sulphur, leaving it coated with a thin film of molten sulphur, which thus is continually renewed and comes in intimate contact with the gaseous current containing $SO_3$, which as said passes in the contrary direction through the upper portion of the drum. Thus the countercurrent principle is applied in the apparatus in such a manner that sulphur progressively poorer and poorer of organic substances comes to contact a gas richer and richer of $SO_3$, which enhances the effectivity of purification.

The inclined position of the apparatus, together with its inner baffles forming pockets for the fluid mass, ensures that the latter, on advancing in the apparatus and, therefore, with the progress of purification, may not be contaminated again with the impurities present initially.

Figure 3:
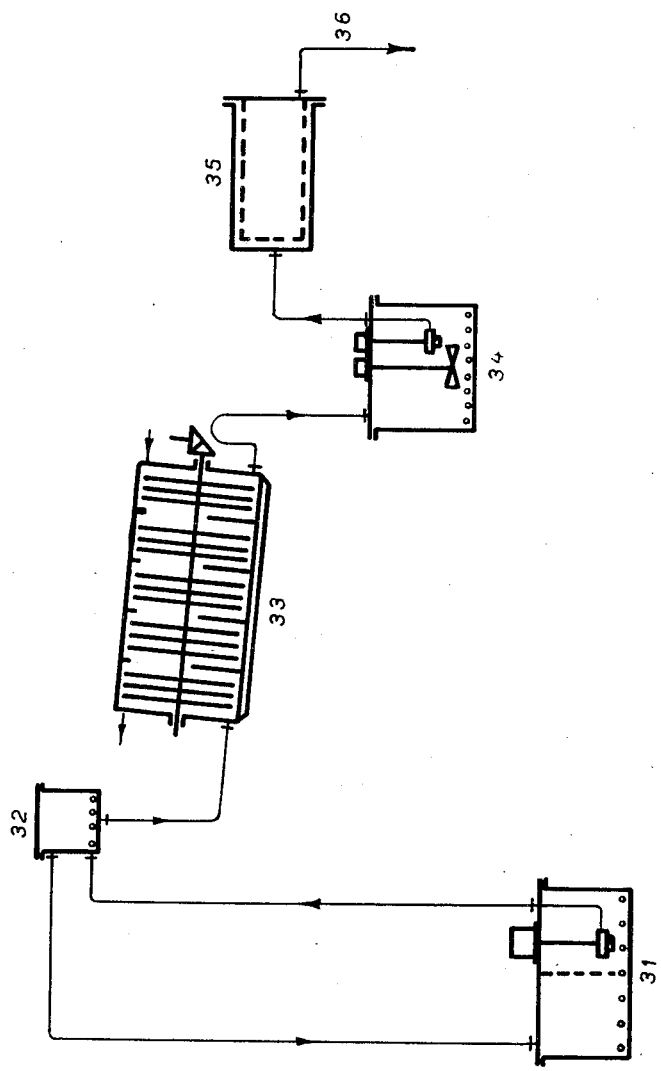
Fig. 3 is a flow sheet of a plant for the purification of sulphur with the process according to the invention, embodying an apparatus according to Fig. 1.

In Fig. 3 there is schematically diagrammed the layout of a plant for the refining of sulphur with the process and apparatus according to the invention. Raw sulphur is melted at 31 and is conveyed by a pump to the measuring device 32, which drops it into the apparatus 33 operated as described hereinbefore. After refining, sulphur passes into the vessel 34, where a filtering aid is added if needed, and then it is filtered in the filter 35. The filtered sulphur leaving at 36 is then solidified according to need, or even conveyed to combustion in a plant for the manufacture of sulphuric acid. If this is a contact process plant, the apparatus hereinbefore described finds special and advantageous application, since the pressure drop existing after and before the catalysis chamber may be utilized for the circulation of the gas containing $SO_3$.

Of course, an embodiment of the apparatus in practice may comprise variants and modifications without departing from the scope of the invention.

We claim:

1. In apparatus for purifying raw sulphur, a hollow drum, supports for said drum to hold it in a position inclined with respect to the horizontal, inlet and outlet means for passing molten sulphur through the lower half of said drum, inlet and outlet means for passing an $SO_3$-gas current through the upper half of said drum in countercurrent relationship to the molten sulphur, a rotary shaft passing through said drum along its axis, seal bearings for said shaft at both heads of said drum, means for rotating said shaft, a plurality of spaced radially arranged baffles mounted in and dividing the lower part of said drum into a number of imperforate-walled compartments open at the top, said baffles extending up only to a point slightly below said axial shaft, and a plurality of spaced sheet metal discs having a diameter slightly smaller than the inner diameter of said drum concentrically fitted on said shaft to rotate therewith and extending into said compartments.

2. Apparatus according to claim 1, in which the lower half of the drum is provided with an external heating jacket.

3. Apparatus according to claim 1, in which said metal discs are provided with perforations.

4. Apparatus according to claim 3, in which the perforations of consecutive discs are staggered with relation to each other.

References Cited in the file of this patent

UNITED STATES PATENTS

| | | |
|---|---|---|
| 1,704,796 | Honigmann | Mar. 12, 1929 |
| 1,778,571 | Stratton | Oct. 14, 1930 |
| 1,958,666 | Honigmann | May 15, 1934 |
| 1,967,874 | Dunn | July 24, 1934 |
| 2,445,919 | Mitchell | July 27, 1948 |

FOREIGN PATENTS

| | | |
|---|---|---|
| 547,693 | Germany | Mar. 26, 1932 |